United States Patent
Jansen

(10) Patent No.: US 11,699,051 B2
(45) Date of Patent: Jul. 11, 2023

(54) INSPECTION METHOD AND INSPECTION DEVICE FOR INSPECTING SECURITY MARKINGS

(71) Applicant: Robert Jansen, Potsdam (DE)

(72) Inventor: Robert Jansen, Potsdam (DE)

(73) Assignee: Robert Jansen, Potsdam (DE)

( * ) Notice: Subject to any disclaimer, the term of this patent is extended or adjusted under 35 U.S.C. 154(b) by 218 days.

(21) Appl. No.: 17/270,898

(22) PCT Filed: Aug. 23, 2019

(86) PCT No.: PCT/EP2019/072638
§ 371 (c)(1),
(2) Date: Apr. 23, 2021

(87) PCT Pub. No.: WO2020/039091
PCT Pub. Date: Feb. 27, 2020

(65) Prior Publication Data
US 2021/0264187 A1    Aug. 26, 2021

(30) Foreign Application Priority Data
Aug. 24, 2018 (DE) .................. 10 2018 120 775.1

(51) Int. Cl.
*G06K 7/12* (2006.01)
*G07D 7/00* (2016.01)
(Continued)

(52) U.S. Cl.
CPC .............. *G06K 7/12* (2013.01); *G06V 10/143* (2022.01); *G06V 10/225* (2022.01);
(Continued)

(58) Field of Classification Search
USPC .................................................. 382/112, 181
See application file for complete search history.

(56) References Cited

U.S. PATENT DOCUMENTS 7,922,209 B1 * 4/2011 Beretta ............... G07D 7/1205
283/901
2020/0130399 A1 * 4/2020 Henriksen ........... B42D 25/382

FOREIGN PATENT DOCUMENTS

DE       4319555 A1   12/1994
DE      10247252 A1    4/2004
(Continued)

OTHER PUBLICATIONS

Demant, Christian et al., "Industrielle Bildverarbeitung—Wie optische Qualitatskontrolle wirklich funktioniert", 2nd Edition, Berlin/Heidelberg: Springer-Verlag 2002, pp. 108-109, 6 pages with machine translation.
(Continued)

*Primary Examiner* — Kathleen Y Dulaney
(74) *Attorney, Agent, or Firm* — Ware, Fressola, Maguire & Barber LLP

(57) ABSTRACT

An inspection method is provided for checking the integrity of a combination of a security marking and an identification label, the security marking including at least one contrast field having a comparatively high reflectivity in a first and a second wavelength range, and a security field, having different reflection properties in the first wavelength range compared to the second wavelength range, and the identification label having at least one light background around mark components printed with dark color. The inspection method may include capturing possibly averaged gray values of the contrast field and the identification label background, comparing the gray values, and determining whether the gray value of the contrast field of the security marking deviates from the gray value of the background of the identification label by less than a predefined maximum amount.

16 Claims, 6 Drawing Sheets

Figure 1:
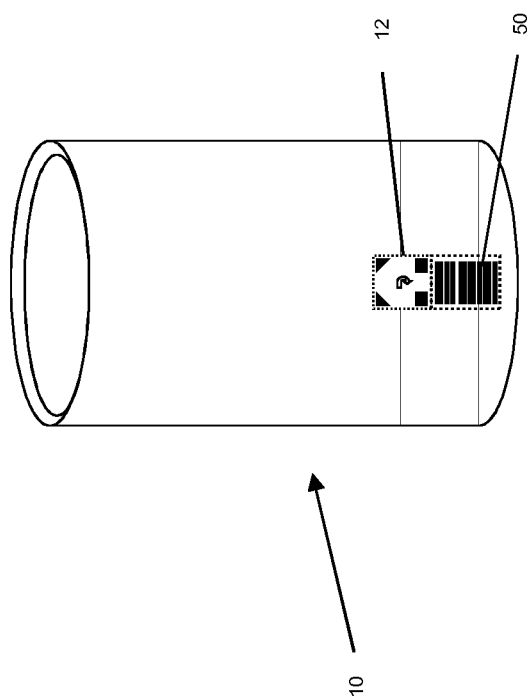

(51) Int. Cl.
*G07D 7/12* (2016.01)
*G06V 10/143* (2022.01)
*G06V 10/22* (2022.01)
*G06V 30/224* (2022.01)

(52) U.S. Cl.
CPC ......... *G06V 30/2247* (2022.01); *G07D 7/003* (2017.05); *G07D 7/12* (2013.01)

(56) References Cited

FOREIGN PATENT DOCUMENTS

| | | |
|---|---|---|
| DE | 102006011143 A1 | 5/2007 |
| DE | 102006012798 A1 | 8/2007 |
| DE | 102016011766 A1 | 4/2018 |
| EP | 1821096 A2 | 8/2007 |
| EP | 1953674 A1 | 8/2008 |

OTHER PUBLICATIONS

Office Action dated May 28, 2019 issued by the German Patent Office in corresponding German Patent Application No. 102018120775.1, 14 pages with machine translation.

PCT International Search Report and Written Opinion dated Dec. 4, 2019 from corresponding Application No. PCT/EP2019/072638, 20 pages with English translation.

PCT International Preliminary Report on Patentability dated Mar. 2, 2021 from corresponding Application No. PCT/EP2019/072638, 8 pages.

* cited by examiner

INSPECTION METHOD AND INSPECTION DEVICE FOR INSPECTING SECURITY MARKINGS

The application relates to a readout unit and an inspection method for reading out and inspecting security markings, in particular security markings on packaging, such as those used as part of a deposit system, for example.

Security markings are used in a variety of ways in order to make counterfeiting more difficult and to offer the best possible guarantee for the authenticity of a document, a product, a banknote or the like. Security markings are used for products that are subject to a deposit because the deposit value is typically higher than the value of the packaging itself.

It is known to apply a security marking to an outer shell of the packaging or a label or a banderole of the packaging, which can consist for example of plastic, sheet metal or card-board, which has several fields arranged next to one another having different reflective properties. One of these fields is, for example, a contrast field with a comparatively high reflectivity in a broad wavelength range, which includes, for example, visible and infrared light. A second of these fields is a dark field which, compared to the contrast field, has a low reflectivity in the broad wavelength range. A third field is a security field having different reflection properties in at least one known wavelength range than in another known wavelength range. For example, the security field can have a low reflectivity in a first e.g. visible wavelength range of light. In contrast, in a second, different, visible or invisible wavelength range of the light, the security field has a higher reflectivity—or vice versa.

The reflectivity of the respective field for a respective wavelength depends on the color with which the respective field is applied, in particular printed, to a respective background. The color with which the contrast field is printed or the contrast fields are printed is typically a broadband reflective color, while the color with which the dark field or the dark fields are printed is a broadband absorbing color. The contrast field can also be formed by the background itself if it itself is broadband reflective. If this is the case, the contrast field is not printed, but is formed by the unprinted background.

In many cases, in addition to a security marking, an identification label is also provided, which identifies the product type, the manufacturer or the banknote, etc., for example by indicating the manufacturer, product or value of the banknote. The identification label can be, for example, a GTIN shown in the form of a barcode or a QR code. GTIN is the abbre-viation for Global Trade Item Number, i.e. a global article number.

In addition to mark components of the identification label typically printed with black or in a broad wavelength range of dark color, the background—i.e. the area around the mark components of the identification label printed with dark color—is light and in particular white in order to obtain a good contrast. The light, in particular white, background of the mark components of the identification label is typically formed by the unprinted background on which the dark mark components of the identification label are also printed. This is also regularly the same background that also forms the bright contrast field of the security marking. The contrast field (or the contrast fields) of the security marking and the background around the mark components of the identification label that are printed with dark color therefore regularly have the same light, e.g. white, color.

The mark components of the identification label printed with dark color and the dark fields of the security marking are usually printed with the same broadband dark color, e.g. carbon black, on a light background.

The color with which the security field is printed on the light background or the security fields are printed on the light background has a higher absorption in the first wavelength range than in the second wavelength range. Correspondingly, the color with which the security field is printed or the security fields are printed has a higher reflectivity or a higher transparency or both in the second wavelength range. If the color with which the security field is printed or the security fields are printed has a higher reflectivity in the second wavelength range than in the first wavelength range, the intensity of the reflected light in the second wavelength range is in any case greater than the intensity of the reflected light in the first wavelength range. If the color with which the security field is printed or the security fields are printed has a higher transparency in the second wavelength range than in the first wavelength range, the intensity of the reflected light in the second wavelength range is greater than the intensity of the reflected light in the first wavelength range in cases where the background under the color with which the security field is printed has a sufficiently high reflectivity in this second wavelength range. If the color with which the security field is printed or the security fields are printed already has a high reflectivity in the second wavelength range, the reflectivity of the background under the color with which the security field is printed or the security fields are printed is less or not at all decisive.

One possibility of inspecting a security marking of the type described is to illuminate the security marking for one thing with light in the first wavelength range and for another with light in the second wavelength range.

DE 10 2006 011 143, DE 102 47 252 and DE 43 19 555 each describe a security field that is printed with a color that strongly absorbs visible light and is transparent to infrared light, so that the reflectivity of the security field in the infrared wavelength range is determined by the background under the color with which the security field is printed. The background of the security field is white, so that the security field also appears just as white under infrared light as the background and the surroundings of the security field, because the color with which the security field is printed is transparent to infrared light and therefore invisible, so that under infrared light, the background is visible under the color with which the security field is printed.

Another inspection method aims to determine the extent to which the security field reflects more strongly in the second wavelength range than in the first wavelength range. This method has the advantage that the inspection of the security field does not have to refer to the surroundings of the security field or any reference field that has the same color as the background on which the color for the security field is printed.

In exchange, the other inspection method has the disadvantage that the intensity of the light reflected by the security field depends on the intensity of the illumination—also referred to below as the illuminance. The illuminance in turn depends not only on the intensity of a light source, but also, for example, on the distance that the security field to be inspected has from the light source, or on the angle at which the light from the light source strikes the security field.

The security marking is typically located on items with a value, for example beverage packaging subject to a deposit. If the valuable item is handed over, e.g. beverage packaging subject to a deposit is returned, the value (e.g. the deposit)

is paid out and the payor charges the paid out value on—to whom results from the identification label, for example. Now, it is possible to replace the original identification label with a different identification label, so that the value paid out is charged to someone other than the actually obligated party.

The invention has the object of providing an improved inspection method and means for an improved inspection method.

According to the invention, this object is achieved by an inspection method which is configured in such a way that it inspects a combination of security marking and identification label to determine whether both are located on a uniform background, e.g. on the same substrate.

According to the invention, this is done by inspecting whether the background of the identification label and the contrast field of the security marking have the same gray value at at least one wavelength—that is, are equally bright under the same lighting. For this purpose, a grayscale image is captured from the combination of identification label and security marking by means of a corresponding camera. The camera converts the different brightnesses of the mark components of the identification label and security marking into numerical values, which, for example, can be between 0 and 255 in a digital camera with an image sensor with a dynamic range of 8 bits, wherein usually only a portion of the maximum avail-able dynamic range is utilized.

Since identical and, in particular, uniform illumination is not always given, a gray value correction is preferably carried out by means of corresponding local point operations during the image preprocessing.

In particular, an inspection method is proposed for checking the integrity of a combination of a security marking and an identification label. Said security marking comprises at least one contrast field, which has a comparatively high reflectivity in a first and a second wavelength range, and a security field, which has different reflection properties in the first wavelength range compared to the second wavelength range. Said identification label has at least one light background around mark components printed with dark color, comprising the following steps:

- illuminating the combination of security marking and identification label with light in a specified wavelength range,
- capturing an image of the combination of security marking and identification label,
- identifying the security marking and the identification label in the image,
- capturing a possibly averaged gray value of the contrast field of the security marking,
- capturing a possibly averaged gray value of the background of the identification label,
- comparing the gray value of the contrast field of the security marking with the gray value of the background of the identification label,
- determining whether the gray value of the contrast field of the security marking deviates from the gray value of the background of the identification label by less than a predefined maximum amount, and
- generating and outputting a signal indicating a lack of integrity if the gray value of the contrast field of the security marking deviates from the gray value of the background of the identification label by more than a predefined maximum.

Preferably, gray values of the contrast field of the security marking and gray values of the background of the identification label are each determined and averaged in different measurement fields.

A gray value histogram is preferably formed for each of the measurement fields.

The gray value histograms are preferably smoothed.

Preferably, an inspected combination of security marking and identification label is rejected as inadmissible if the gray value of the contrast field of the security marking deviates from the gray value of the background of the identification label by more than 10%.

The inspection method is preferably implemented by a readout unit that is designed to perform the inspection method.

According to further variants of the inspection method, the security marking and, in particular, the security field are inspected not only in two different wavelength ranges, but in multiple different wavelength ranges, so that the spectral properties of the fields of the security marking—in particular the spectral properties of the security field and the color or the colors with which it is printed—can be inspected with even greater differentiation and counterfeiting is made even more difficult.

The inventive concept is also embodied by a readout unit for a security marking on packaging of the type described above. According to the invention, the readout unit is designed to detect an intensity of the light reflected by the security field of the security marking in at least two different wavelength ranges, of which a first wavelength range is a wavelength range in which the security field is strongly absorbed, while the other, second wavelength range is a wavelength range in which the security field reflects comparatively more strongly.

The readout unit preferably possesses an image acquisition unit with an area sensor with light-sensitive sensor elements, which are preferably arranged in a matrix-like manner. The image acquisition unit with an area sensor is used to capture an image imaged on the sensor in two dimensions.

For this purpose, an optical system is usually attached in front of the area sensor, which maps the image of a respective security marking as sharply as possible on the area sensor.

The light-sensitive sensor elements are light-sensitive both in the first wavelength range of light and in the second wavelength range, and are therefore able to capture images of the security marking, and in particular of the security field, when illuminated with light in the first wavelength range as well as when illuminated with light in the second wavelength range.

In this embodiment, whether the image of the security marking is captured with light in the first wavelength range or with light in the second wavelength range thus depends on the light with which the packaging with the security marking is illuminated.

Correspondingly, in a preferred embodiment, the readout unit comprises an illumination module which is designed and arranged to illuminate a field of view of the image acquisition unit simultaneously or alternately with light in the first wavelength range and with light in the second wavelength range. The field of view of the image acquisition unit here means the area in which the security marking of a packaging is located when its image is sharply imaged on the area sensor.

Alternatively, an illumination module can also be provided which simultaneously illuminates the field of view of the image acquisition unit with light in the first wavelength range and with light in the second wavelength range—i.e. broadband. In this case, light filters can alternately be interposed in front of the image acquisition unit, one of which is transparent for light in the first wavelength range and another for light in the second wavelength range, which blocks the respective other wavelength range. Two illumination modules can also be provided, one for light in the first wavelength range and one for light in the second wavelength range, which are activated alternately. Likewise, two image acquisition units can be provided which, due to the properties of their area sensors or due to corresponding filters, on the one hand only capture images with light in the first wavelength range and on the other hand only capture images with light in the second wavelength range.

Finally, it is also possible to provide an illumination module that simultaneously emits both light in the first wavelength range and light in the second wavelength range and an image acquisition unit that is sensitive both to light in the first wavelength range and to light in the second wavelength range, without additional filters being required. The image of the security marking ultimately captured in this variant would be dark in the area of the dark fields, since the dark fields absorb both light in the first wavelength range and light in the second wavelength range. The contrast field would be bright, since the contrast field has a high reflectivity both for light in the first wavelength range and for light in the second wavelength range. The security field, on the other hand, would have a mean gray value, because the security field absorbs light in the first wavelength range, but has a relatively high reflectivity for light in the second wavelength range, which is in any case higher than the reflectivity of the dark fields for light in the second wavelength range. Even if the security field did have the same high reflectivity as the contrast field under light in the second wavelength range, in the last-mentioned embodiment, in which the security marking is illuminated both with light in the first wavelength range and with light in the second wavelength range and the reflected light is captured broadband, the security field will additionally not appear quite bright, but rather gray, since in any case it absorbs light in the first wavelength range.

In the non-broadband variants, the illumination module preferably comprises light sources that are narrow-banded, so that the spectral bandwidth (from half value of the maximum to half value of the maximum (FWHM: full width at half maximum)) is smaller than 60 nm in each case. The mean wavelength between these two half-value wavelengths is referred to in the context of this description as the central wavelength of the respective wavelength range.

The illumination module is preferably designed in such a way that it emits light in the visible wavelength range in at least two partial wavelength ranges, the central wavelengths of which are preferably more than 200 nm apart.

The intensity of the shorter of these two wavelength ranges is preferably between 25 and 40% of the total intensity of the visible light emitted in the two partial wavelength ranges. Light-emitting diodes are particularly well-suited light sources. These have short response times and narrow bandwidths.

The illumination module is preferably designed in such a way that the field of view of the image acquisition unit in which a packaging to be evaluated is located is illuminated uni-formly in such a way that the intensity difference over the field of view is at most 25%.

Furthermore, the illumination module is preferably arranged in such a way that the lighting angle in relation to a surface normal of the security marking to be illuminated is between 20° and 45°.

The image acquisition unit with associated optics for imaging a security marking to be evaluated on the area sensor is preferably designed in such a way that 1 $mm^2$ of the security marking is captured by at least four entire sensor elements (pixels).

The readout unit preferably comprises an evaluation unit which is connected to the image acquisition unit and which is designed to capture mean gray values for at least one contrast field, at least one dark field and the security field, preferably separately for light in the first wavelength range and for light in the second wavelength range. Finally, an assessment unit connected to the evaluation unit is designed to carry out an assessment of the respective security markings captured on the basis of the gray values of the security field captured for the two different wavelength ranges. If the assessment of the gray values by the assessment unit shows that, in particular, the gray values in the area of the image of the security field, when illuminated with light in the second wavelength range, deviate by a predetermined amount from the gray values when illuminated with light in the first wavelength range, the security marking is assessed as OK. Otherwise it is assessed as not OK. If used as intended in a reverse vending machine, the latter would have the effect that packaging would not be accepted, but would be taken back. In this case, the deposit value will not be refunded. If, on the other hand, a respective security marking captured is assessed as OK, the corresponding packaging is accepted by a reverse vending machine with the readout unit in accordance with the invention and the deposit value is refunded.

Figure 2:
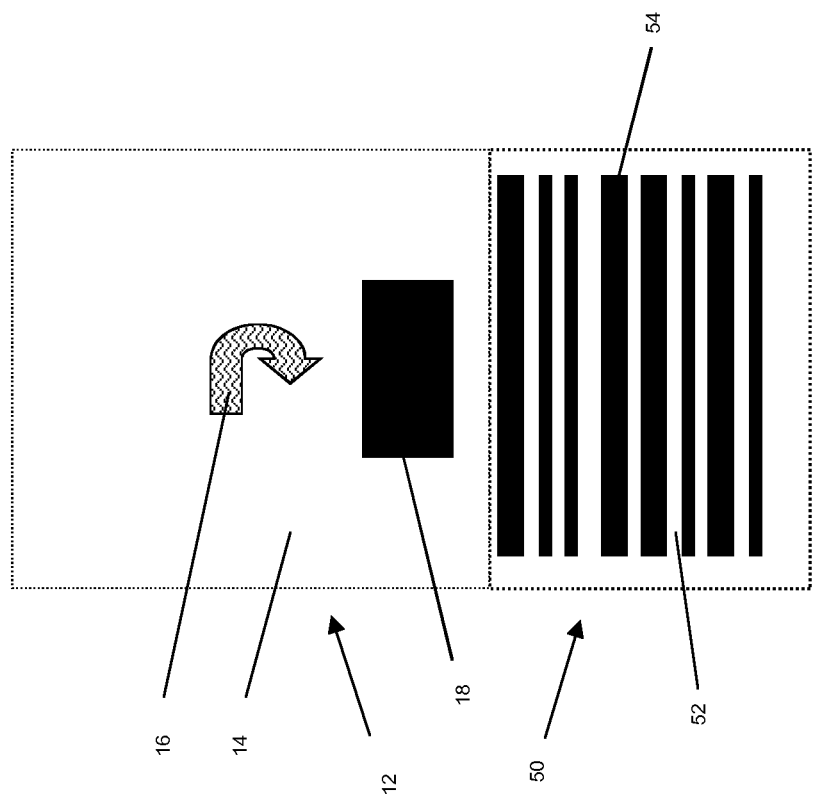
Figure 3:
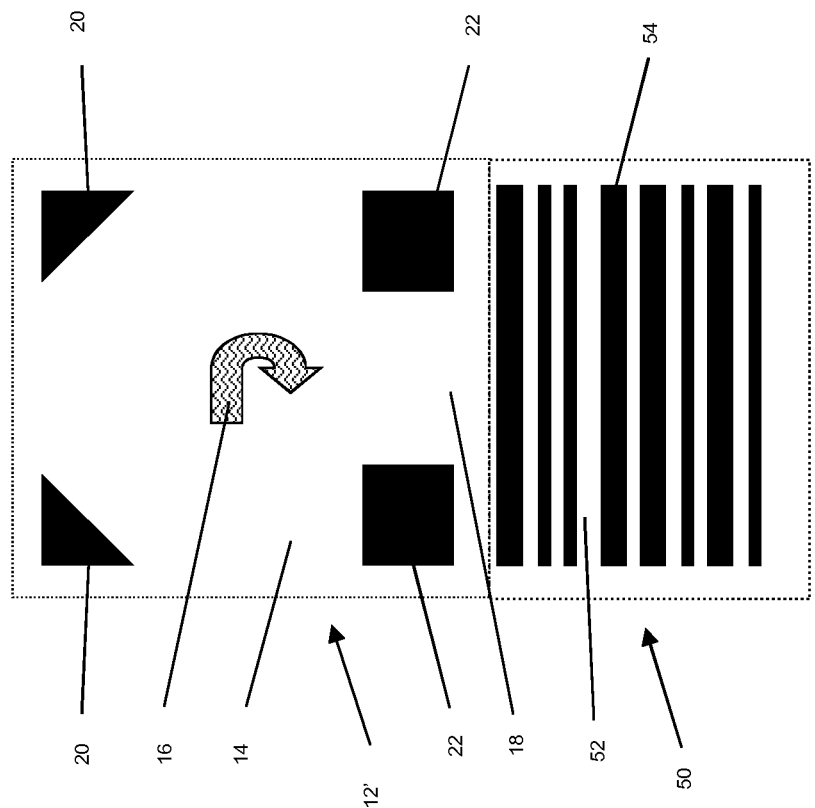
Figure 4:
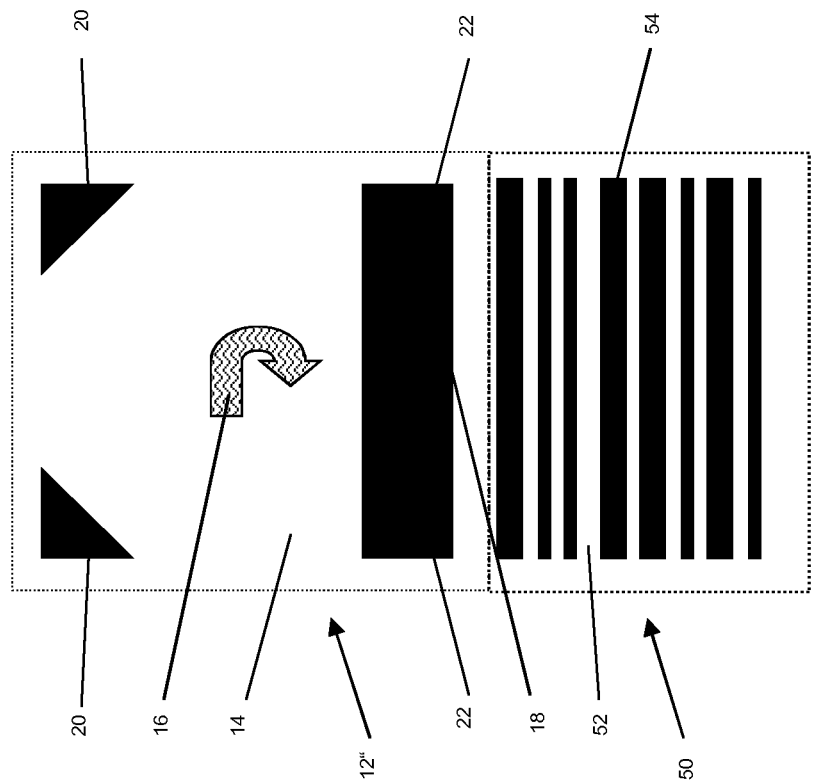
Figure 5:
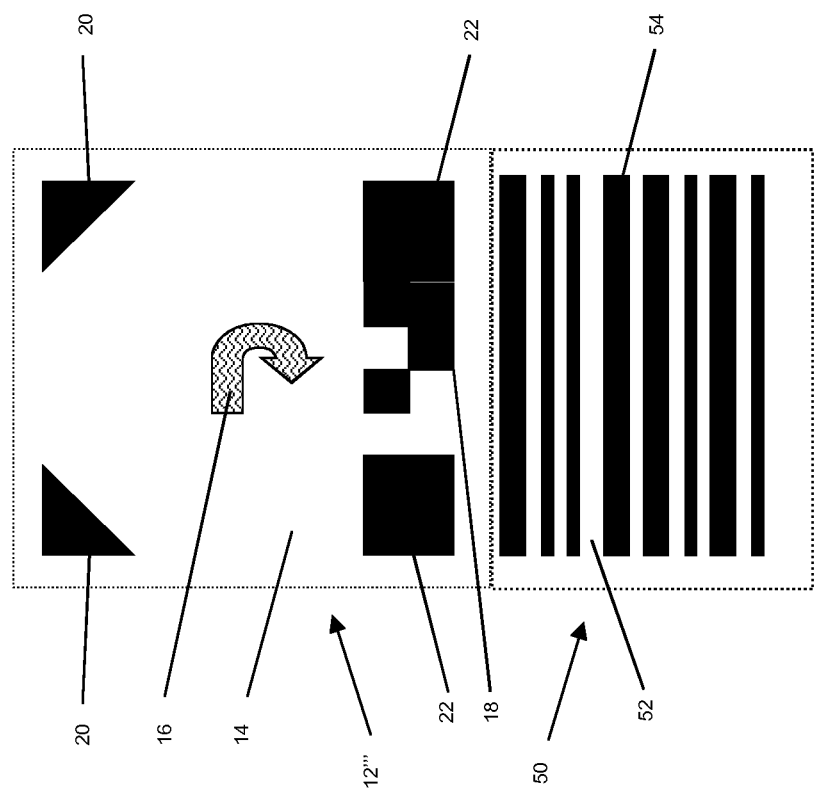
Figure 6:
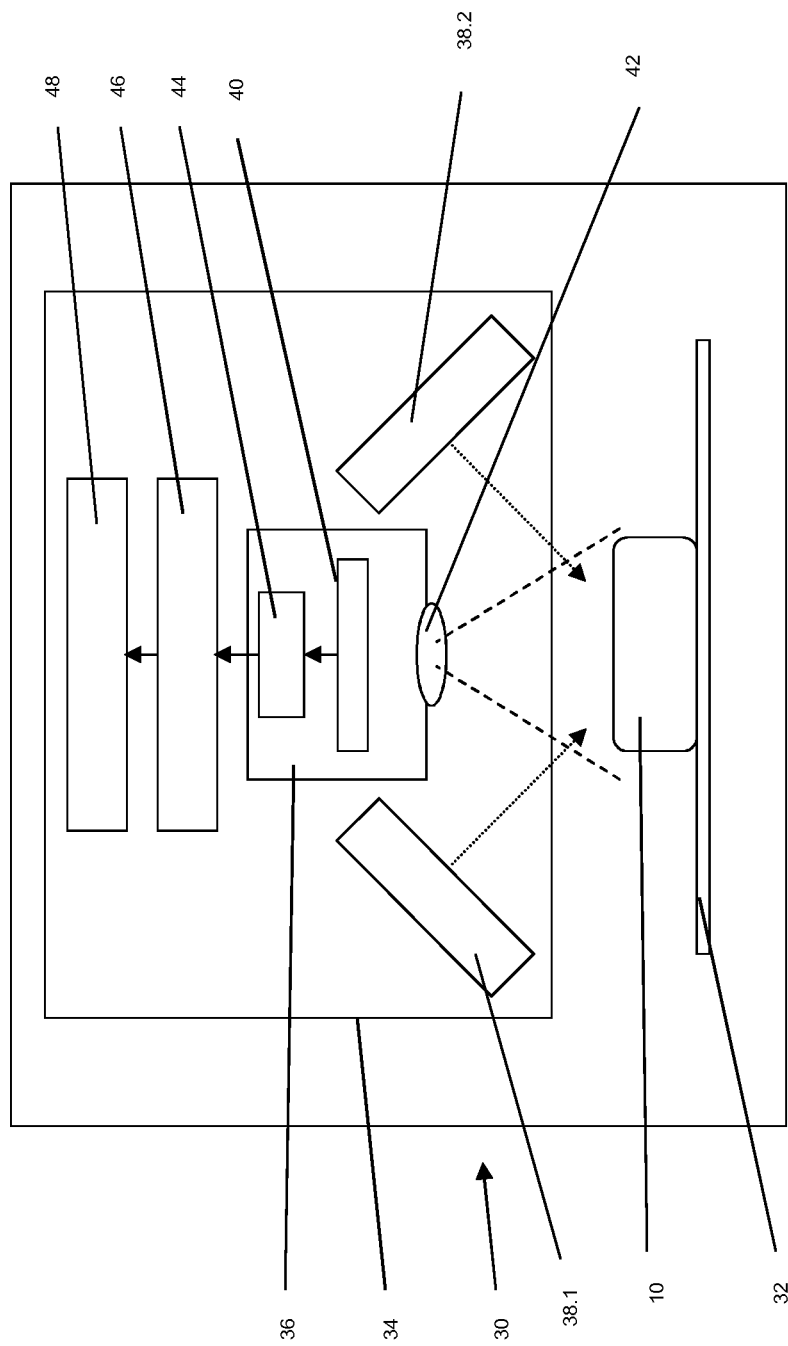

The invention will now be explained in more detail using an exemplary embodiment with reference to the figures:

FIG. 1: shows an example of packaging with a security marking according to the invention;

FIG. 2: shows an embodiment of a simplest variant of a security marking for packaging according to the invention;

FIG. 3: shows an expanded embodiment of the security marking from FIG. 2;

FIG. 4: shows the security marking from FIG. 3 in its form for a different background;

FIG. 5: shows an alternative embodiment of a security marking;

FIG. 6: shows a schematic representation of a readout unit according to the invention.

FIG. 1 shows, by way of example, a packaging 10 in the form of a can with a security marking 12 and an identification label 50, which in the example shown is in the form of a barcode.

The security marking 12 serves to identify the packaging 10 as packaging for which a deposit is to be paid when purchased by a consumer, which the consumer receives back when the packaging is returned. The security marking is designed in such a way that it is not easily possible to equip such packaging for which no deposit has been paid with the security marking. Since the deposit value is greater than the packaging value, whoever takes back the packaging and pays out the deposit would suffer a loss in the case of packaging with forged security markings.

FIG. 2 shows the essential features of the security marking 12, namely a comparatively strongly reflective contrast field 14 which encloses a security field 16 and a signal field 18. The contrast field 14 is highly reflective in a broad wavelength range, in particular in the visible wavelength range of light and in the transition to the infrared wavelength range.

The security field 16 has the property that it is weakly reflective in a first, preferably visible wavelength range of the light, that is to say it is strongly absorbing and therefore appears dark.

In a second, likewise preferably visible wavelength range of the light, however, the security field 16 is highly reflective, for example just as strongly reflective as the contrast field 14. The security field 16 obtains this property of different reflectivity at different wavelengths in that the color with which the security field 16 is printed has a lower absorption in the second wavelength range than in the first wavelength range.

As a result, when viewing the packaging 10 in the first wavelength range, for example in normal daylight, the security field 16 can be clearly seen as a dark field in front of a light background, whereas when viewed in the second wavelength range, for example with the aid of a corresponding camera, the security field 16 can be seen less strongly, since the security field 16 has a higher reflectivity in the second wavelength range, which is similar to that of the contrast field 14.

The reflectivity of the respective field for a respective wavelength—and thus the intensity with which light is reflected in a respective wavelength range—depends on the color with which the respective field is printed on a respective background and on the background itself. The color with which the contrast field 14 is printed or the contrast fields are printed is typically a broadband reflective color, while the color with which the potentially provided dark fields 20 and 22 are printed (see FIG. 3) is a broadband absorbing color. The contrast field 14 can also be formed by the background itself if this is itself broadband reflective, so that the contrast field 14 does not necessarily have to be printed.

The identification label 50 is formed by mark components 52 in the form of bars that are printed with black or in a broad wavelength range of dark colors and are surrounded by a light, for example white, background 54. The background 54 is also located between the mark components 52 printed with dark color in the form of bars. The light, in particular white, background of the mark components of the identification label 50 is typically formed by the background from which the dark mark components 52 of the identification label are also printed. This is the same background that also forms the bright contrast field 14 of the security marking 12. The contrast field (or the contrast fields) 14 of the security marking 12 and the background 52 around the mark components 52 of the identification label 50, which are printed with dark color, therefore have the same light, e.g. white, color.

If the combination of security marking 12 and identification label 50 has been manipulated in an impermissible manner, for example by pasting over the original identification label 52 (the barcode), the contrast field 14 and the background 52 can also have brightnesses that differ slightly from one another. According to the invention, this difference can be used to detect counterfeits or impermissible manipulations.

The mark components 52 of the identification label 50 printed with dark color and the dark fields 20 and 22 of the security marking 12 are usually printed with the same broadband dark color, e.g. carbon black, on a light background.

The color with which the security field 16 is printed has a higher absorption in the first wavelength range than in the second wavelength range. Accordingly, the color with which the security field 16 is printed has a higher reflectivity or a higher transparency or both in the second wavelength range compared to the first wavelength range. If the color with which the security field 16 is printed has a higher reflectivity in the second wavelength range than in the first wavelength range, the intensity of the reflected light in the second wavelength range is in any case greater than the intensity of the reflected light in the first wavelength range. If the color with which the security field 16 is printed has a higher transparency in the second wavelength range than in the first wavelength range, the intensity of the reflected light in the second wavelength range is greater than the intensity of the reflected light in the first wavelength range in cases where the background under the color with which the security field 16 is printed has a sufficiently high reflectivity in this second wavelength range. If the color with which the security field 16 is printed already has a high reflectivity in the second wavelength range, the reflectivity of the background under the color with which the security field 16 is printed is less or not at all decisive.

For security reasons, however, it is advantageous if the background under the color with which the security field 16 is printed has a reflectivity that deviates from the reflectivity of the contrast field 14. This means that the security field 16 can be printed with two colors, namely initially with a first color with reflective properties that differ from those of the contrast field 14, and then with a second color so that the second color covers the first color. The second color with which the security field 16 is printed is then that color which, as described above, has a higher reflectivity and/or transparency in the second wavelength range than in the first wavelength range.

The security field 16 has an asymmetrical shape, so that its orientation in relation to the rest of the security marking can be clearly recognized.

A further component of the security marking 12 is a signal field 18 which, depending on the type of packaging, is either highly absorbent (as shown in FIG. 2) or highly reflective in a broad wavelength range that includes visible and infrared light. In the last-mentioned case—highly reflective signal field 18—the signal field 18 has the same color as the background 14 and is therefore practically non-existent, but determined exclusively by the abstract def-inition of its intended location. In the exemplary embodiment according to FIG. 2, the signal field 18 is shown in a strongly absorbing color, that is to say weakly reflective and therefore dark.

The signal field 18 serves to signal to a device for reading out the security marking whether and, if so, which stored parameters are to be taken into account when inspecting the security marking. Parameters can be stored correction factors, for example.

In order to make it easier to find the security marking 12' (see FIG. 3) on a packaging 10 and to find the signal field 18 within the security marking 12', the security marking 12' preferably comprises further fields, namely dark fields first in the form of corner markings 20 and second in the form of orientation markings 22.

The dark fields 20 and 22 have the property of being strongly absorbing in the first wavelength range as well as in the second wavelength range, that is to say being weakly reflective and thus appearing dark.

The corner markings 20 have the shape of right-angled, isosceles triangles. This shape is particularly suitable because such shapes practically do not occur in the rest of the packaging. The legs of the respective isosceles triangle 20 run parallel to the edges of the security marking 12'. The hypotenuses of the corner markings 20 are thus turned inwards with respect to the security marking 12'.

The orientation markings 22 act, on the one hand, as corner markings for locating two further corners of the overall square security marking 12'. In addition, they enclose the signal field 18 between them, so that it is easy to find even if it has the same color as the background 14, as is shown by way of example in FIG. 3.

Both the corner markings 20 and the orientation markings 22 can also have shapes other than those shown in the exemplary embodiment and, for example, be composed of several partial areas, so that information can be encoded with the corner markings 20 and/or orientation markings 22, in a similar manner as with the aid of the signal field 18.

FIG. 4 basically shows the same security marking 12" as FIG. 3. The only difference between the security marking 12" from FIG. 4 compared to the security marking 12' from FIG. 3 is that the security field 18 in the security marking 12" from FIG. 4 is weakly reflective, i.e. dark, and thus has the same color as the orientation markings 22 and the corner markings 20, while the security field 18' of the security marking 12' from FIG. 3 is highly reflective and thus has the same color as the contrast field 14.

FIG. 5 shows a variant of a security marking 12''' with a signal field 18" divided into a total of 8 partial signal fields, which are either strongly or weakly reflective. In this way, the eight subfields can reproduce a code comprising 8 bits (1 byte). Depending on the value of the respective bit—0 or 1—the associated subfield is highly or weakly reflective. In the exemplary embodiment, the signal field 18" reproduces the byte 10100110 or 01011001, depending on whether the bit value 1 is assigned a strong or weak reflectivity. With such a subdivided signal field 18", not only bivalent information (directionally reflective or diffusely reflective) can be reproduced, but 256-valent information can be reproduced in the exemplary embodiment, for example as a plurality of different correction factors for different packaging, for example.

Referring to the schematic, sketch-like representation of a readout device 30 for reading out security markings 12 on packaging such as the packaging 10, the essential components and the mode of operation will now be described.

The readout device 30, which can be, for example, part of a reverse vending machine for beverage packaging, may comprise a transport means 32 with which a packaging 10' can be positioned in front of a readout unit 34 such that it is in the field of view of the image acquisition unit 36 of the readout unit 34. The field of view is indicated in FIG. 5 by dashed oblique lines. The transport means may comprise conveyor belts and/or rollers. Rollers can be used to rotate a beverage packaging in such a way that the security marking is in the acquisition area of the image acquisition unit 36.

To illuminate the field of view, an illumination module is provided comprising two illumination units 38.1 and 38.2. The direction of illumination and thus the angle at which the illu-urination falls on a packaging 10 to be read out is indicated by dotted arrows. The angle of illumination should be in an angular range between 20° and 45° with respect to the surface normal of the packaging 10. The illumination units 38.1 and 38.2 of the illumination module are arranged and aligned accordingly. However, other illumination angles and, accordingly, other arrangements of the illumination module are also possible. In particular, the illumination module may also have only a single illumination unit which is able to emit light in several wavelength ranges or in a broadband wavelength range.

The illumination units 38.1 and 38.2 possess a large number of light-emitting diodes (LED) as light sources. The illumination unit 38.1 is designed to illuminate the packaging 10 with light intensity of the reflected light in the second wavelength range, while the illumination unit 38.2 illuminates the packaging unit 10 with light intensity of the reflected light in the first wavelength range. The illumination unit 38.2 possesses two types of light-emitting diodes, namely a first type of light-emitting diodes that emit blue, visible light and a second type of light-emitting diodes that emit red, visible light. The visible light which the illumination unit 38.2 emits is thus composed of two wavelength ranges, each with a central wavelength in the blue range of the visible spectrum and a central wavelength in the red range of the visible spectrum. The half-value bandwidth of the two partial wavelength ranges emitted by the illumination unit 38.2 for visible light is in each case less than 50 nm.

With the aid of the illumination module and its illumination units 38.1 and 38.2, targeted lighting scenarios can thus be set. In normal operation, the illumination units 38.1 and 38.2 are operated alternately so that the packaging 10 is either only illuminated with light in the second wavelength range from the illumination unit 38.1 or with light in the first wavelength range from the illumination unit 38.2. As explained at the beginning, however, it is also possible to permanently illuminate the packaging 10 by means of both illumination units 38.1 and 38.2.

The light reflected from the surface of the packaging 10 is captured by the image acquisition unit 36. For this purpose, the image acquisition unit 36 possesses an area sensor 40 and optics 42, which sharply maps an image of the surface of the packaging 10 on a surface of the area sensor 40. The surface of the area sensor 40 is formed by a plurality of light-sensitive sensor elements. These are preferably arranged in a matrix-like manner. The sensor elements of the area sensor 40 and the optics 42 are designed so that a square millimeter of the surface of the packaging 10 is mapped onto a partial surface of the area sensor 40 in such a way that the partial surface contains at least four complete sensor elements. Thus, the imaging scale with which the optics 42 maps an image of the surface of the packaging 10 on the surface of the area sensor 40 depends on the size that the sensor elements occupy on the surface of the area sensor 40 and the distance between the sensor elements. It goes without saying that the optics 42 is designed in such a way that it maps the surface of the packaging 10 sharply on the surface sensor 40 in the area of a depth of field that is required by varying packaging diameters.

The sensor elements of the surface sensor 40 are broadband light-sensitive, that is to say at least in the partial wavelength ranges of the light emitted simultaneously or alternately by the illumination units 38.1 and 38.2. The output value delivered by each individual sensor element of the area sensor 40—also referred to here as a gray value—corresponds to the total intensity of all light in the various wavelength ranges that is captured by the respective sensor element.

The greater the total intensity of the light that strikes the respective sensor element, the greater the output value delivered by a respective sensor element of the surface sensor 40, which is also referred to here as the gray value. The total intensity of the light that strikes the respective sensor element is made up of the partial intensities of the light in the different wavelength ranges from which the light that strikes a respective sensor element is composed.

This total intensity is the intensity of the light captured by the sensor element in the second wavelength range when the packaging is illuminated exclusively by the illumination unit 38.1 with light in the second wavelength range. In the same way, the output value of a respective sensor element corresponds to the respective intensity in the first wavelength range of the light if the packaging surface is illuminated exclusively by the illumination unit 38.2 with light in the first wavelength range.

If, in contrast, the surface of the packaging 10 is illuminated by both the illumination unit 38.1 and the illumination unit 38.2 simultaneously with light in the second wavelength range and with light in the first wavelength range, the light intensity detected by a respective sensor element—and thus the gray value output—depends on the sum of the intensity with which a respective surface element assigned to the sensor element via the image reflects light in the first wavelength range and in the second wavelength range.

This means that sensor elements which capture, for example, part of the contrast field 14 of the security marking 12 always capture a high brightness value and thus deliver a large output value—and thus a high gray value $w_i$. In contrast, sensor elements that capture part of an orientation marking 22 or a corner marking 20 will always detect a low brightness value and thus also deliver a low output value and gray value $s_i$, regardless of whether the illumination is with light in the first wavelength range or with light in the second wavelength range. Conversely, the gray value $d_1$ delivered by a sensor element onto which a part of the security field 16 is mapped depends on the type of lighting.

When the packaging is illuminated with light in the first wavelength range, the intensity reflected by the security field 16 is low, so that a sensor element detecting part of the security field 16 only delivers a low gray value $d_1$. However, if the packaging is illuminated with light in the second wavelength range, the intensity of the light reflected by the security field is significantly higher—depending on the background—and can, for example, corre-spond to the intensity reflected by the contrast field 14. Correspondingly, a sensor element on which part of the security field is imaged delivers a high gray value $d_2$ when the packaging 10 is illuminated with light in the second wavelength range. If, on the other hand, the packaging 10 is simultaneously illuminated with light in the first wavelength range and in the second wavelength range, the gray value delivered by a sensor element capturing the security field is a mean gray value.

Within the image acquisition unit 36, preprocessing of the gray values delivered by the area sensor 40 takes place in a preprocessing unit 44. The processed gray values (output values of the sensor elements of the area sensor 40) are supplied to an evaluation unit 46 in which, firstly, the various areas of the security marking are sensed with the aid of basically known pattern recognition methods.

This image sensing of the image of the security marking also serves to determine the location of the signal field 18 in order to be able to read out its intensity. Depending on the intensity of the light reflected by the signal field 18, the evaluation unit 46 switches on a different reference threshold for evaluating the intensity of the light reflected by the security field 16 in the second wavelength range.

Secondly, the intensity values delivered by the various fields of the security marking are compared with the respective reference thresholds in order to assess the respective security marking. This assessment is carried out by an assessment unit which is part of the evaluation unit 46 and is therefore not shown in greater detail in FIG. 5. The reference threshold for the intensity values that were captured when the security marking was illuminated with light in the second wavelength range in the area of the security field 16 is of particular importance for the assessment.

The assessment of the intensity values represented by corresponding gray values $d_2$, which are to be assigned to the security field 16 when illuminated with light in the second wavelength range, takes place with reference to the gray values $d_1$—and thus the intensity values—that are to be assigned to the security field 16 when illuminated with light in the first wavelength range. Depending on how much the intensity of the reflected light in the second wavelength range deviates from the intensity of the reflected light in the first wavelength range, packaging is accepted and the deposit is either paid out or not.

The inspection by the evaluation unit 46 takes place according to the following procedure:

To inspect the security marking, the intensities of the light reflected by the security field 16 in two different wavelength ranges are recorded in the form of gray values $d_1$, $d_2$. In addition, the intensities of the light reflected by the contrast field 14 in the first wavelength range are recorded in the form of an optionally averaged gray value $w_1$.

The gray values are preferably scaled—and thus normalized—in such a way that the difference between the averaged numerical gray value of the contrast field and the averaged numerical gray value of one or more dark fields of an image (a capture) of the security marking 12 is set to 100% (contrast normalization). This enables gray values from different images of the security marking 12 to be compared.

To check the integrity of the combination of security marking 12 and identification label 50, this combination is illuminated in one or the other wavelength range and, in addition to the gray value of the contrast field 14 $w_1$ or $w_2$, the gray value of the background 52 of the identification label 50 $b_1$ or $b_2$ is determined. If the gray value of the contrast field 14 $w_1$ or $w_2$ deviates from the gray value of the background 52 of the identification label 50 $b_1$ or $b_2$ by more than 10%, the combination of security marking 12 and identification label 50 is rejected as inadmissible. For this purpose, a signal indicating a lack of integrity of the combination of security marking and identification label is generated and output if the gray value of the contrast field of the security marking deviates from the gray value of the background of the identification label by more than a predefined maximum—namely by more than 5% or 10%, for example.

Since the brightness of the contrast field 14 and/or the background 52 can be uneven, for example as a result of uneven lighting or a non-level surface, it regularly occurs that the sensor elements of the area sensor 40, onto which the corresponding partial areas of the contrast field 14 and the background 52 are mapped, will not all deliver the same gray value. A gray value histogram is therefore preferably formed and smoothed.

It is also advantageous to provide several measurement windows for determining the gray value of the contrast field 14 or of the background 52. For example, each light field between the bars of the barcode 50 can be its own measurement field.

This is preferably done separately for the gray values of the contrast field 14 and the gray values of the background 52 as follows:

Calculate the histogram.
Smooth the histogram five times (kernel: [1,1,1,1,1]).
Determine the histogram maximum (HistMax) (highest peak with the lowest gray value).
Remove all histogram values that are smaller than Clip-Factor (0.5)*HistMax.
Calculate the mean value from the modified histogram.
Calculate the gray value of the contrast field or the background at the end as the mean value of the individual gray values in the measurement windows.

Instead of or in addition to the integrity check based on the brightness values of the contrast field and background, a geometry check can also be provided in which, for example, the parallelism of mark components of the security marking 12 and the identification label is checked.

The evaluation unit 46 is also connected to a control unit 48 which is used, for example, to control the illumination units 38.1 and 38.2 and which also controls the transport means 32 in order, for example, to rotate the packaging 10 by means of the transport means 32, so that the security marking on the surface of the packaging 10 is located in the field of view of the readout unit 36. The image acquisition by the evaluation unit 46 is also used for this purpose.

The control unit also controls the refund of the deposit and the takebacks of packaging.

The invention claimed is:

1. An inspection method for checking the integrity of a combination of a security marking and an identification label, said security marking comprising at least one contrast field with a comparatively high reflectivity in a first and a second wavelength range and a security field having different reflection properties in the first wavelength range compared to the second wavelength range, and said identification label having at least one light background around mark components printed with dark color, the inspection method comprising the following steps:
    illuminating the combination of the security marking and the identification label with light in a specified wavelength range,
    capturing an image of the combination of the security marking and the identification label,
    identifying the security marking and the identification label in the image,
    capturing a possibly averaged gray value of the at least one contrast field of the security marking,
    capturing a possibly averaged gray value of the at least one light background of the identification label,
    comparing the possibly averaged gray value of the at least one contrast field of the security marking with the possibly averaged gray value of the at least one light background of the identification label,
    determining whether the possibly averaged gray value of the at least one contrast field of the security marking deviates from the possibly averaged gray value of the at least one light background of the identification label by less than a predefined maximum amount, and
    generating and outputting a signal indicating a lack of integrity if the possibly averaged gray value of the at least one contrast field of the security marking deviates from the possibly averaged gray value of the at least one light background of the identification label by more than the predefined maximum amount.

2. The inspection method according to claim 1, wherein possibly averaged gray values of the at least one contrast field of the security marking and possibly averaged gray values of the at least one light background of the identification label are each determined and averaged in different measurement fields.

3. The inspection method according to claim 2, wherein a gray value histogram is formed for each of the measurement fields.

4. The inspection method according to claim 3, wherein the gray value histograms are smoothed.

5. The inspection method according to claim 1, wherein an inspected combination of security marking and identification label is rejected as inadmissible if the possibly averaged gray value of the at least one contrast field of the security marking deviates from the possibly averaged gray value of the at least one light background of the identification label by more than 10%.

6. A readout unit comprising:
    an illumination module,
    an image acquisition unit for capturing light reflected from a surface of a security marking and an identification label, and
    an evaluation unit being connected to the image acquisition unit,
said readout unit being configured for reading out a combination of the security marking and the identification label, of which the security marking comprises at least one contrast field with a comparatively high reflectivity in a first and a second wavelength range and a security field having different reflection properties in the first wavelength range compared to the second wavelength range, and of which the identification label comprises at least one light background around mark components printed with dark color wherein the readout unit is designed to:
    capture a possibly averaged gray value of the at least one contrast field of the security marking,
    capture a possibly averaged gray value of the at least one light background of the identification label,
    compare the possibly averaged gray value of the at least one contrast field of the security marking with the possibly averaged gray value of the at least one light background of the identification label, and
    determine whether the possibly averaged gray value of the at least one contrast field of the security marking deviates from the possibly averaged gray value of the at least one light background of the identification label by less than a predefined maximum amount.

7. The readout unit according to claim 6, wherein the image acquisition unit comprises an area sensor having light-sensitive sensor elements, preferably arranged in a matrix-like manner, for capturing an image imaged on the area sensor in two dimensions, being sensitive to light both in the first wavelength range of the light and in the second wavelength range.

8. The readout unit according to claim 7, wherein the illumination module is designed and arranged to illuminate a field of view of the image acquisition unit simultaneously or alternately with light in the first wavelength range and in the second wavelength range.

9. The readout unit according to claim 8, wherein the illumination module emits light in the visible wavelength range with two main wavelengths when the readout unit is in operation, one of which corresponds to red light and the other main wavelength corresponds to blue light.

10. The readout unit according to claim 8, wherein the illumination module comprises light-emitting diodes as light sources.

11. The readout unit according to claim 10, wherein the illumination module comprises different light-emitting diodes, of which a first number of light-emitting diodes emits light in a second wavelength range when the readout unit is in operation, the second wavelength of which is matched to a color of the security field in such a way that the emitted second wavelength is a maximum of 100 nm above a wavelength at which absorption of the color is less than 40% of an absorption of the color in the first wavelength range.

12. The readout unit according to claim 9, wherein the illumination module comprises light-emitting diodes as light sources.

13. The readout unit according to claim 12, wherein the illumination module comprises different light-emitting diodes, of which a first number of light-emitting diodes emits light in a second wavelength range when the readout unit is in operation, the second wavelength of which is matched to a color of the security field in such a way that the emitted second wavelength is a maximum of 100 nm above a wavelength at which absorption of the color is less than 40% of an absorption of the color in the first wavelength range.

14. The inspection method according to claim 2, wherein an inspected combination of security marking and identification label is rejected as inadmissible if the possibly averaged gray value of the at least one contrast field of the security marking deviates from the possibly averaged gray value of the at least one light background of the identification label by more than 10%.

15. The inspection method according to claim 3, wherein an inspected combination of security marking and identification label is rejected as inadmissible if the possibly averaged gray value of the at least one contrast field of the security marking deviates from the possibly averaged gray value of the at least one light background of the identification label by more than 10%.

16. The inspection method according to claim 4, wherein an inspected combination of security marking and identification label is rejected as inadmissible if the possibly averaged gray value of the at least one contrast field of the security marking deviates from the possibly averaged gray value of the at least one light background of the identification label by more than 10%.

* * * * *